United States Patent
Yang et al.

(10) Patent No.: US 12,184,775 B2
(45) Date of Patent: Dec. 31, 2024

(54) METHOD AND DEVICE EMPLOYING SMART CONTRACT TO REALIZE IDENTITY-BASED KEY MANAGEMENT

(71) Applicants: STATE GRID CORPORATION OF CHINA, Beijing (CN); STATE GRID DIGITAL TECHNOLOGY HOLDING CO., LTD., Beijing (CN); STATE GRID XIONG'AN FINANCIAL TECHNOLOGY GROUP CO., LTD., Heibei (CN)

(72) Inventors: Dongwei Yang, Beijing (CN); Dong Wang, Beijing (CN); Wei Jiang, Beijing (CN); Ping Zhen, Beijing (CN); Jiaxing Xuan, Beijing (CN); Guomin Li, Beijing (CN); Xin Shi, Beijing (CN); Wanli Ma, Beijing (CN); Junwei Ma, Beijing (CN); Yang Wang, Beijing (CN); Lei Zhou, Beijing (CN)

(73) Assignees: STATE GRID CORPORATION OF CHINA, Beijing (CN); STATE GRID DIGITAL TECHNOLOGY HOLDING CO., LTD., Beijing (CN); STATE GRID XIONG'AN FINANCIAL TECHNOLOGY GROUP CO., LTD., Hebei (CN)

( * ) Notice: Subject to any disclaimer, the term of this patent is extended or adjusted under 35 U.S.C. 154(b) by 771 days.

(21) Appl. No.: 17/440,294

(22) PCT Filed: Jun. 18, 2019

(86) PCT No.: PCT/CN2019/091788
§ 371 (c)(1),
(2) Date: Sep. 17, 2021

(87) PCT Pub. No.: WO2020/237751
PCT Pub. Date: Dec. 3, 2020

(65) Prior Publication Data
US 2022/0158834 A1   May 19, 2022

(30) Foreign Application Priority Data
May 27, 2019 (CN) .......................... 201910445653.3

(51) Int. Cl.
*H04L 29/06* (2006.01)
*H04L 9/08* (2006.01)
(Continued)

(52) U.S. Cl.
CPC .......... *H04L 9/0891* (2013.01); *H04L 9/0861* (2013.01); *H04L 9/3073* (2013.01); *H04L 9/3239* (2013.01); *H04L 9/50* (2022.05)

(58) Field of Classification Search
None
See application file for complete search history.

(56) References Cited

U.S. PATENT DOCUMENTS

| 11,283,797 B2* | 3/2022 | Laucius ............... H04L 63/0884 |
| 11,722,301 B2* | 8/2023 | Ebrahimi ............... H04L 67/146 713/168 |

(Continued)

FOREIGN PATENT DOCUMENTS

| CN | 101166088 A | 4/2008 |
| CN | 101170404 A | 4/2008 |

(Continued)

OTHER PUBLICATIONS

F. Tang, S. Ma, Y. Xiang and C. Lin, "An Efficient Authentication Scheme for Blockchain-Based Electronic Health Records," in IEEE Access, vol. 7, pp. 41678-41689, 2019, doi: 10.1109/ACCESS.2019. 2904300. (Year: 2019).*

(Continued)

*Primary Examiner* — Jeffery L Williams
(74) *Attorney, Agent, or Firm* — Cooper Legal Group, LLC (57) ABSTRACT

Provided are a method and device employing a smart contract to realize identity-based key management. The method comprises: running a smart contract, and executing a key management process, wherein the key management process comprises: when a key of a target user requires an update and the target user is not a supervised user, generating a master public key and a master private key pertaining to the target user; acquiring, from a blockchain, identity information of the target user; generating a first target private key according to the master public key and the master private key pertaining to the target user and the (Continued)

identity information of the target user; and replacing a current private key of the target user with the first target private key.

15 Claims, 6 Drawing Sheets

(51) Int. Cl.
  H04L 9/30 (2006.01)
  H04L 9/32 (2006.01)
  H04L 9/00 (2022.01)

(56) References Cited

U.S. PATENT DOCUMENTS

| | | | |
|---|---|---|---|
| 2007/0041583 | A1 | 2/2007 | Boneh |
| 2010/0229241 | A1 | 9/2010 | Liu |
| 2017/0353309 | A1 | 12/2017 | Gray |
| 2021/0160056 | A1* | 5/2021 | Yan ............... H04L 63/126 |
| 2022/0029807 | A1* | 1/2022 | Ebrahimi ........... H04L 9/3213 |
| 2022/0158834 | A1* | 5/2022 | Yang ............. H04L 9/0861 |
| 2023/0021047 | A1* | 1/2023 | Ammar ............. H04L 9/0847 |
| 2023/0342849 | A1* | 10/2023 | Doney ............. G06Q 20/3678 |

FOREIGN PATENT DOCUMENTS

| | | |
|---|---|---|
| CN | 104022880 A | 9/2014 |
| CN | 106411901 A | 2/2017 |
| CN | 107425972 A | 12/2017 |
| CN | 107888384 A | 4/2018 |
| CN | 108235805 A | 6/2018 |
| CN | 108462696 A | 8/2018 |
| CN | 109327309 A | 2/2019 |
| CN | 109600219 A | 4/2019 |
| CN | 109792386 A | 5/2019 |
| JP | H11177547 A | 7/1999 |
| JP | 2004112540 A | 4/2004 |
| JP | 2012032843 A | 2/2012 |

OTHER PUBLICATIONS

Wang, Huaqun, De-biao He and Yimu Ji. "Designated-verifier proof of assets for bitcoin exchange using elliptic curve cryptography." Future Gener. Comput. Syst. 107 (2017): 854-862. (Year: 2017).*
D. Sharma and D. Jinwala, "ID-based secure key generation protocol," 2011 2nd International Conference on Computer and Communication Technology (ICCCT-2011), Allahabad, 2011, pp. 416-421, doi: 10.1109/ICCCT.2011.6075145. (Year: 2011).*
"Security Services Using Blockchains: A State of the Art Survey", Feb. 2019, Tara Salman, Maede Zolanvari, Aiman Erbad, Raj Jain and Mohammed Samaka, IEEE Communications Surveys & Tutorials, vol. 21, No. 1, First Quarter, pp. 858-880.
Supplementary European Search Report in the European application No. 19930811.5, mailed on Dec. 22, 2021.
English translation of the Written Opinion of the International Search Authority in the international application No. PCT/CN2019/091788, mailed on Jan. 23, 2020.
"A Cross Domain Authentication Scheme Based on Blockchain Technology", Nov. 2018, Xiao-Ting Ma, Wen-Ping Ma and Xiao-Xue Liu, Acta Electronica Sinica, vol. 46, No. 11, 9 pgs.
International Search Report in the international application No. PCT/CN2019/091788, mailed on Jan. 23, 2020, 2 pgs.
Research on Identity-based Data Auditing Technology in Cloud Computing, Sep. 2017, Qian Kun, A Thesis Submitted to Xidian University for the degree of Master in Cryptography, 73 pgs.
First Office Action of the Chinese application No. 201910445653.3, issued on Mar. 4, 2020, 15 pgs.
Notice of Allowance of the Chinese application No. 201910445653.3, Issued on Sep. 1, 2020, 5 pgs.

* cited by examiner

METHOD AND DEVICE EMPLOYING SMART CONTRACT TO REALIZE IDENTITY-BASED KEY MANAGEMENT

CROSS-REFERENCE TO RELATED APPLICATION

The present application is based upon and claims priority to Chinese patent application No. 201910445653.3 filed on May 27, 2019, the disclosure of which is hereby incorporated by reference in its entirety.

TECHNICAL FIELD

The disclosure relates to the field of computer technology, and in particular to a method and device for implementing identity-based key management by using a smart contract.

BACKGROUND

At present, in an Identity-Based Cryptography (IBC) scheme, a master public key and a master private key are generated by a Key Generation Center (KGC). Then, the KGC generates a private key for a user by using the master public key, the master private key and identity information (such as name, e-mail, or identification number) of the user, and the identity information of the user serves as a public key. There is no need to bind to a digital certificate, thus the complex management of the digital certificate in a Public Key Infrastructure (PKI) scheme is avoided.

However, in the IBC scheme, if the private key of the user is leaked and needs to be updated, the private key of the user must be updated by changing the identity information of the user. Once the identity information of the user is changed, self-certification of the user's identity would be degraded, affecting the performance of key update in the IBC scheme.

SUMMARY

To solve the related technical problem, the present disclosure provides a method and device for implementing identity-based key management by using a smart contract.

The solution of embodiments of the present disclosure is provided as follows.

A method for implementing identity-based key management by using a smart contract, which includes that: the smart contract is run to execute a key management process. The key management process includes that: responsive to that a key of a target user needs to be updated and the target user is an unsupervised user, a master public key and a master private key belonging to the target user are generated; identity information of the target user is acquired from a blockchain; a first target private key is generated based on the master public key and the master private key belonging to the target user and the identity information of the target user; and a present private key of the target user is replaced with the first target private key.

The key management process in the above solution further includes that: responsive to that the target user is an unsupervised user and the present private key of the target user is leaked, or responsive to that the target user is a supervised user, the identity information of the target user is acquired from the blockchain; the identity information of the target user is updated, and the updated identity information is taken as target identity information; a second target private key is generated by using the target identity information; and the present private key of the target user is replaced with the second target private key.

Updating the identity information of the target user in the above solution includes that: a variable part of the identity information of the target user is updated.

The key management process in the above solution further includes that: the blockchain is queried for state information of first target identity information of a user stored in the blockchain.

The key management process in the above solution further includes that: state information that is associated with the first target private key is signed by using a historical private key used by the target user.

A device for implementing identity-based key management by using a smart contract, the device includes: a running module, configured to run the smart contract to execute a key management process. The key management process includes that: responsive to that a key of a target user needs to be updated and the target user is an unsupervised user, a master public key and a master private key belonging to the target user are generated; identity information of the target user is acquired from a blockchain; a first target private key is generated based on the master public key and the master private key belonging to the target user and the identity information of the target user; and a present private key of the target user is replaced with the first target private key.

In the above solution, the key management process that the running module is configured to run the smart contract to execute further includes that: responsive to that the target user is an unsupervised user and the present private key of the target user is leaked, or responsive to that the target user is a supervised user, the identity information of the target user is acquired from the blockchain; the identity information of the target user is updated, and the updated identity information is taken as target identity information; a second target private key is generated by using the target identity information; and the present private key of the target user is replaced with the second target private key.

In the above solution, in the key management process that the running module is configured to run the smart contract to execute, updating the identity information of the target user includes that: a variable part of the identity information of the target user is updated.

In the above solution, the key management process that the running module is configured to run the smart contract to execute further includes that: the blockchain is queried for state information of first target identity information of a user stored in the blockchain.

In the above solution, the key management process that the running module is configured to run the smart contract to execute further includes that: state information that is associated with the first target private key is signed by using a historical private key used by the target user.

Compared with the related art, the embodiments of the disclosure provide the following beneficial effects:

In the embodiments of the disclosure, in the key management process that smart contract is run to execute, if a key of a target user needs to be updated and the target user is an unsupervised user, a master public key and a master private key belonging to the target user is generated instead of using a master public key and a master private key already generated by a KGC; identity information of the target user is acquired from a blockchain without changing the identity information of the target user; a first target private key is generated based on the master public key and the master private key belonging to the target user that are respectively different from the master public key and master private key already generated by the KGC and the unchanged identity information of the target user; and a present private key of the target user is replaced with the first target private key, thus realizing update of the private key of the user. In the process of updating the private key of the user, since the identity information of the target user is not changed, the self-certification of the target user's identity would not be degraded, thereby the performance of key update in the IBC scheme is improved.

BRIEF DESCRIPTION OF THE DRAWINGS

In order to illustrate the solution of embodiments of the present disclosure more clearly, the accompanying drawings that will be used in description of the embodiments are briefly introduced below. It is apparent that the drawings illustrate merely some embodiments of the present disclosure, according to which one of ordinary skill in the art would be able to obtain other drawings without paying any inventive effort.

DETAILED DESCRIPTION

The technical solution of the present disclosure will be described clearly and completely with reference to the accompanying drawings in the embodiments of the present disclosure. It is apparent that the embodiments described herein are some of the embodiments of the present disclosure rather than all embodiments of present disclosure. All other embodiments obtained by one of ordinary skill in the art without paying inventive efforts based on the embodiments of the disclosure shall fall within the scope of the present disclosure.

Embodiments of the present disclosure disclose a method and device for implementing identity-based key management by using a smart contract. The method includes: running the smart contract to execute a key management process. The key management process includes that: responsive to that a key of a target user needs to be updated and the target user is an unsupervised user, a master public key and a master private key belonging to the target user are generated; identity information of the target user is acquired from a blockchain; a first target private key is generated based on the master public key and the master private key belonging to the target user and the identity information of the target user; and a present private key of the target user is replaced with the first target private key. According to the embodiments of the present disclosure, the performance of key update in the IBC scheme can be improved.

The method for implementing identity-based key management by using a smart contract according to an embodiment of the present disclosure is described below. The method is applied to a computer device. The method includes the following operations.

At S11, the smart contract is run to execute a key management process.

Figure 1:
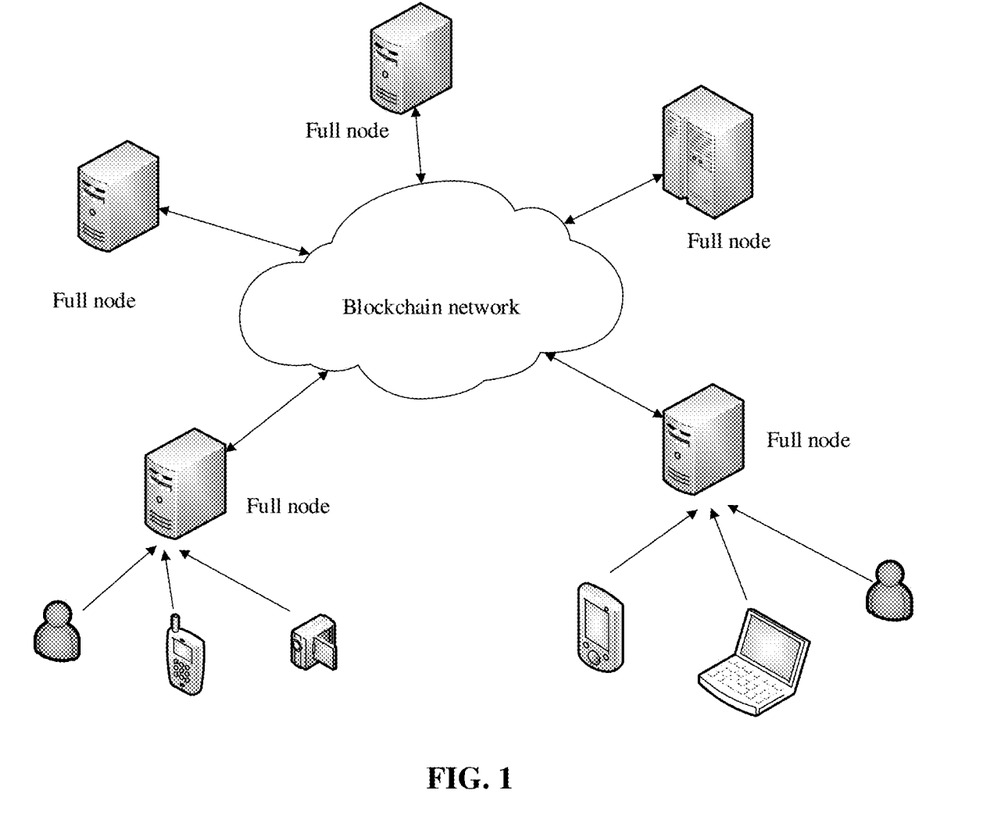
FIG. 1 illustrates a schematic diagram of architecture of a blockchain network according to embodiments of the present disclosure.

In the embodiment, a blockchain network is provided. As illustrated in FIG. 1, the blockchain network includes multiple full nodes, and same data is stored in each of the full nodes, such as a public key of a user and a master public key generated by a KGC.

The blockchain network may be understood as a public blockchain network or an alliance chain network.

It should be noted that a private key of the user and a master private key generated by the KGC are held by the user rather than stored in the blockchain, so as to avoid leakage of the private key and the master private key.

The smart contract may be run in the blockchain network, to execute a key management process. The key management process includes that: identity information of the user is registered, and the registered identity information is stored in the blockchain.

It may be understood that initial authentication of the user is achieved by registering the identity information of the user.

The operation of running the smart contract and registering the identity information of the user may be understood as: calling a function of RegisterID (f_ID, v_ID, b_supervise, b_valid) to register the identity (ID) information of the user. f_ID and v_ID form the registerted ID. That is to say, ID=(f_ID∥v_ID), where f_ID is a fixed identification part of ID, such as name; and v_ID is a variable part of ID, such as date or other random number, and is mainly used for key update. The state of the v_ID is a null value when initially registered. b_supervise may be understood as a Boolean variable, and mainly indicates whether the registered ID is associated with a supervised user. If the registered ID is associated with a supervised user, the private key of the user may be obtained by an administrator of the smart contract, and the key of the user needs to be updated by the administrator of the smart contract subsequently. If the registered ID corresponds to an unsupervised user, the private key of the user cannot be obtained by the administrator of the smart contract after user registration, and the key of the user needs to be updated by the user per se subsequently. b_valid indicates whether the user ID is valid currently.

Figure 2:
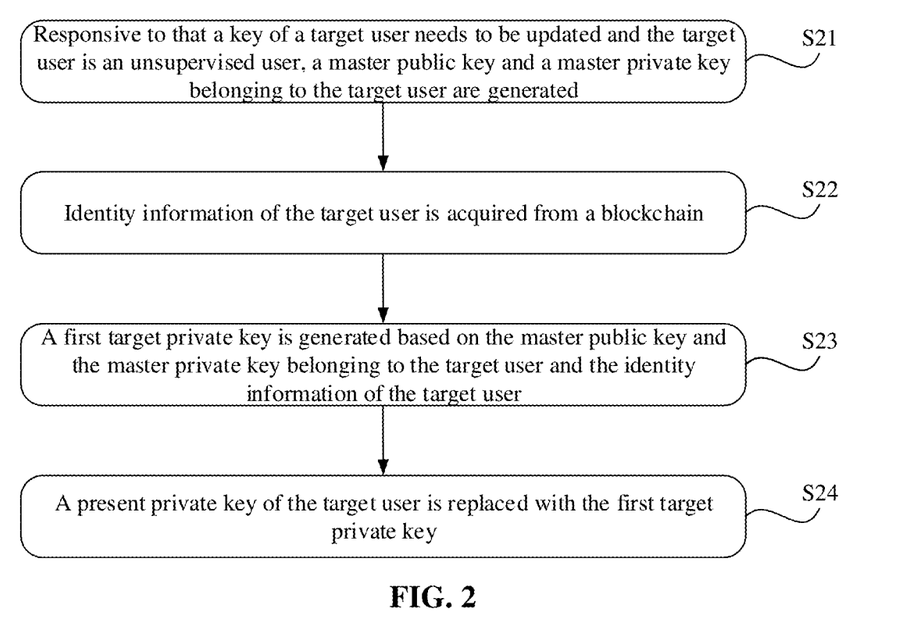
FIG. 2 illustrates a schematic flowchart of a key management process according to embodiments of the present disclosure.

In the embodiment, as illustrated in FIG. 2, the key management process may further include the following operations.

At S21, responsive to that a key of a target user needs to be updated and the target user is an unsupervised user, a master public key and a master private key belonging to the target user are generated.

The master public key and the master private key which belong to the target user may be understood that: the values of the master public key and the master private key belonging to the target user are respectively different from the master public key and the master private key generated by the KGC.

The master public key and the master private key belonging to the target user are mainly used for generating the private key of the target user.

At S22, identity information of the target user is acquired from a blockchain.

It may be understood that identity information of multiple users is stored in the blockchain, and thus the identity information of the target user can be acquired from the blockchain. Specifically, the identity information of the target user may be acquired from the blockchain according to an identification of the target user.

The identity information of the target user may be understood as: the public key of the target user.

At S23, a first target private key is generated based on the master public key and the master private key belonging to the target user and the identity information of the target user.

At S24, a present private key of the target user is replaced with the first target private key.

The present private key of the target user may be understood as: a private key that can be used by the target user at present.

By replacing the present private key of the target user with the first target private key, update of the private key of the target user is achieved.

If the target user is an unsupervised user, there is no need to update the identity information of the target user, i.e., the public key of the target user. The update of the private key of the target user is achieved by means of the master public key and the master private key belonging to the target user that are respectively different from the master public key and the master private key generated by the KGC, and the public key of the target user that has not been updated.

In the embodiment of the disclosure, in the key management process that the smart contract is run to execute, responsive to that a key of a target user needs to be updated and the target user is an unsupervised user, a master public key and a master private key belonging to the target user is generated instead of using a master public key and a master private key already generated by a KGC; identity information of the target user is acquired from a blockchain instead of changing the identity information of the target user; a first target private key is generated based on the master public key and the master private key belonging to the target user that are respectively different from the master public key and master private key already generated by the KGC, and the unchanged identity information of the target user; and a present private key of the target user is replaced with the first target private key, thereby realizing the update of the private key of the user. In the process of updating the private key of the user, since the identity information of the target user is not changed, the self-certification of the target user's identity would not be degraded, thereby improving the performance of key update in the IBC scheme.

Moreover, since an unsupervised user is able to update the key by him/herself, the problem that the private keys of all users need to be updated when the master private key and the master public key are changed by the KGC is avoided. Thus, a completely decentralized key management method is accomplished, and the practicability is improved.

Figure 3:
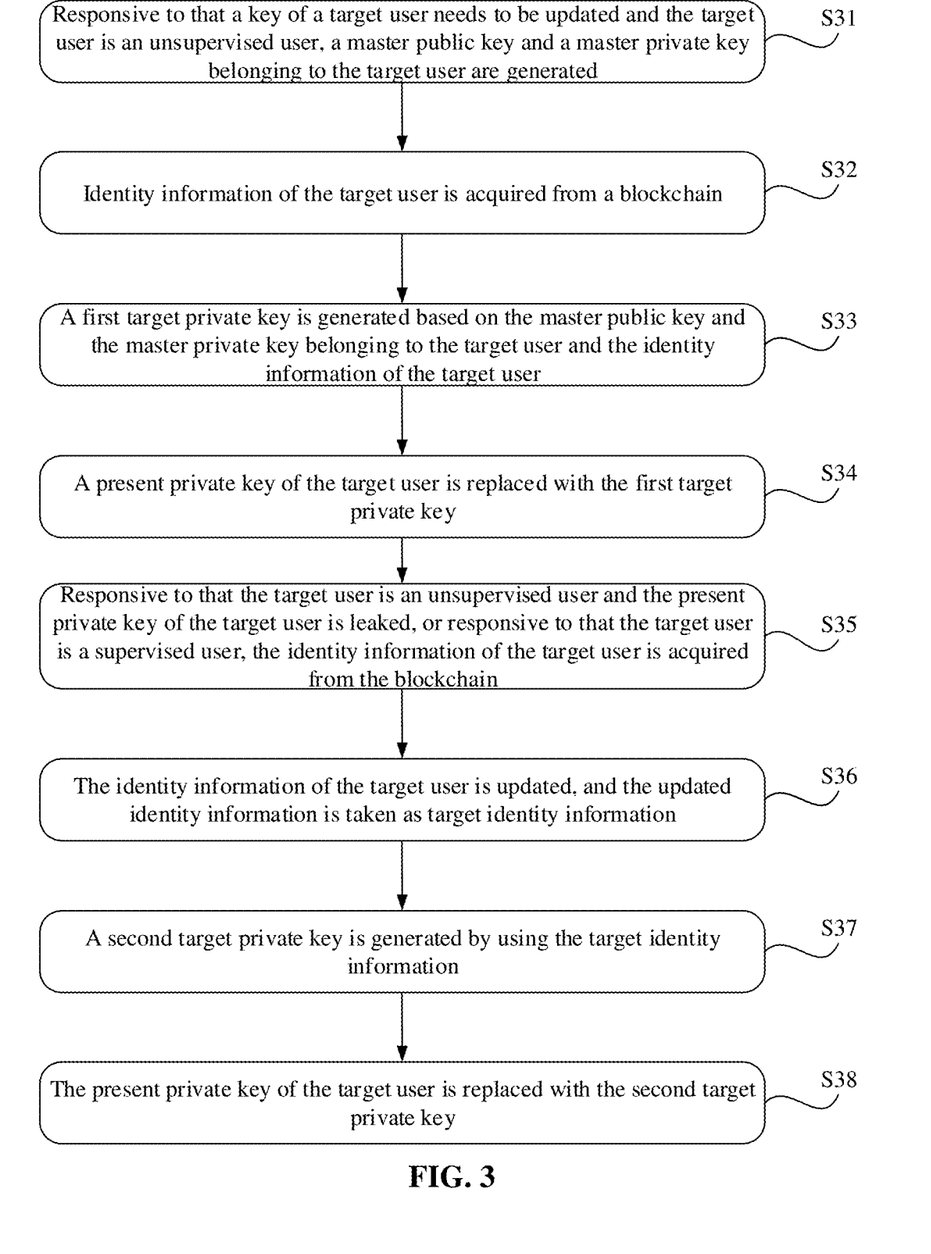
FIG. 3 illustrates a schematic flowchart of another key management process according to embodiments of the present disclosure.

As a second embodiment of the present disclosure, as illustrated in FIG. 3 is a schematic flowchart of another key management process provided according to the present disclosure. The embodiment mainly lies in an extended method for the key management process described in the above first embodiment. As illustrated in FIG. 3, the method may include but is not limited to the following operations.

At S31, responsive to that a key of a target user needs to be updated and the target user is an unsupervised user, a master public key and a master private key belonging to the target user are generated.

At S32, identity information of the target user is acquired from a blockchain.

At S33, a first target private key is generated based on the master public key and the master private key belonging to the target user and the identity information of the target user.

At S34, a present private key of the target user is replaced with the first target private key.

The detailed description of S31-S34 may refer to the corresponding description of S21-S24 in the first embodiment and will not be elaborated herein again.

At S35, responsive to that the target user is an unsupervised user and the present private key of the target user is leaked, or responsive to that the target user is a supervised user, the identity information of the target user is acquired from the blockchain.

Herein, b_valid may be set to an invalid state when the private of the target user is leaked. Then, the key update process is started, to firstly acquire the identity information of the target user from the blockchain.

At S36, the identity information of the target user is updated, and the updated identity information is taken as target identity information.

At S37, a second target private key is generated by using the target identity information.

Herein, the operation that the second target private key is generated by using the target identity information may be understood as: the target identity information and the master public key and the master private key generated by the KGC are used to generate a new private key to serve as the second target private key.

At S38, the present private key of the target user is replaced with the second target private key.

Herein, the present private key of the target user may be understood as a private key that can be used by the target user at present.

The present private key of the target user is replaced with the second target private key, to realize the update of the private key of the target user.

In the embodiment, if the target user is an unsupervised user and the present private key of the target user is leaked, or if the target user is a supervised user, the the public key of the target user is updated by updating the identity information of the target user, and the private key of the target user is updated based on the updated public key.

Figure 4:
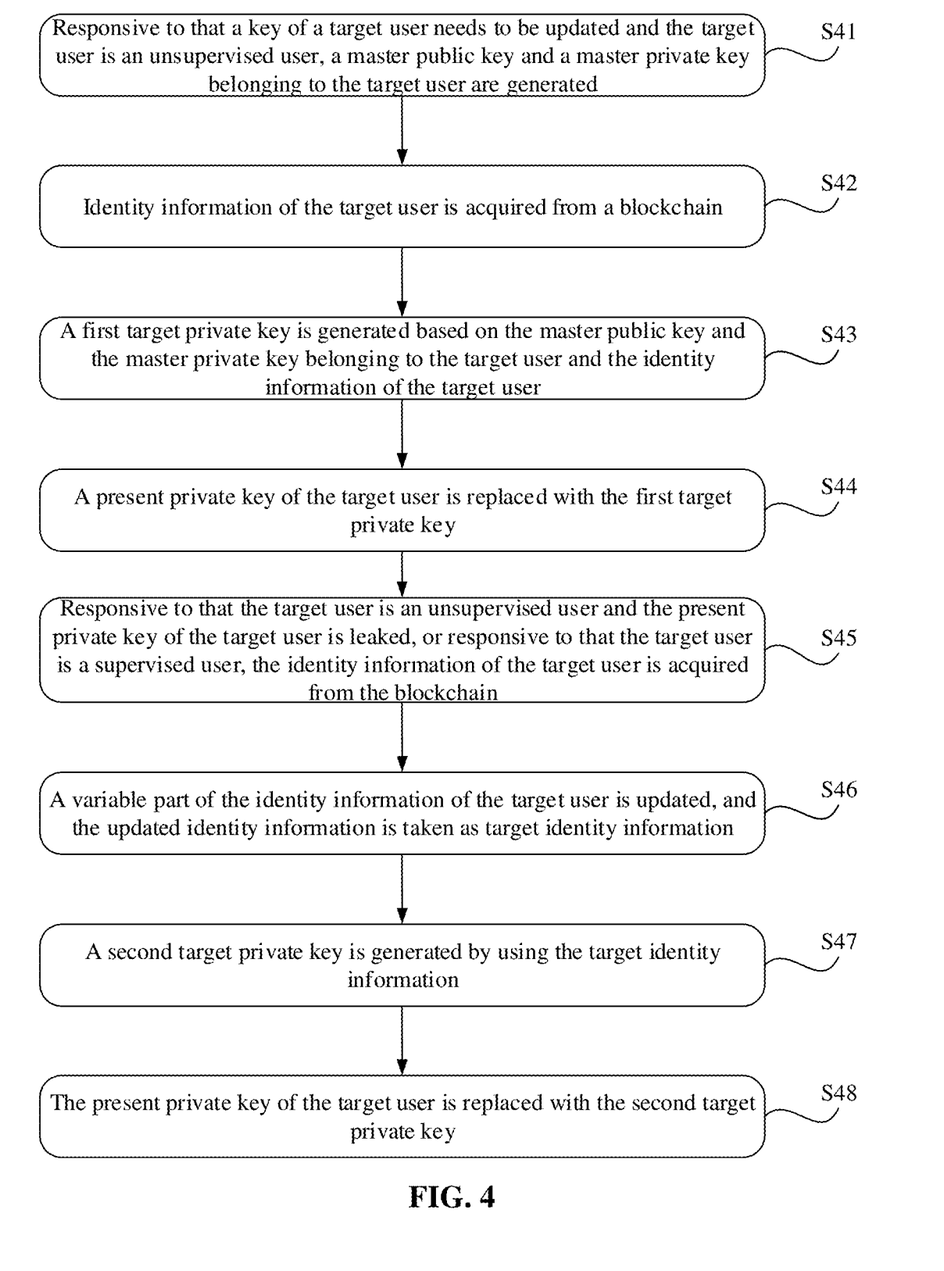
FIG. 4 illustrates a schematic flowchart of a further key management process according to embodiments of the present disclosure.

As a third embodiment of the present disclosure, as illustrated in FIG. 4 is a schematic flowchart of a further key management process provided according to the present disclosure. The embodiment mainly lies in a detailed method for the key management process described in the above second embodiment. As illustrated in FIG. 4, the method may include but is not limited to the following operations.

At S41, responsive to that a key of a target user needs to be updated and the target user is an unsupervised user, a master public key and a master private key belonging to the target user are generated.

At S42, identity information of the target user is acquired from a blockchain.

At S43, a first target private key is generated based on the master public key and the master private key belonging to the target user and the identity information of the target user.

At S44, a present private key of the target user is replaced with the first target private key.

At S45, responsive to that the target user is an unsupervised user and the present private key of the target user is leaked, or responsive to that the target user is a supervised user, the identity information of the target user is acquired from the blockchain.

The detailed description of S41-S45 may refer to the corresponding description of S31-S35 in the second embodiment and will not be elaborated herein again.

At S46, a variable part of the identity information of the target user is updated, and the updated identity information is taken as target identity information.

Herein, the identity information of the target user may include a fixed part and a variable part.

The variable part may be understood as a part that can be changed, such as date or other random numbers.

Updating the variable part of the identity information of the target user and not updating the fixed part of the identity information of the target user can ensure the validity and reliability of the identity information of the target user.

At S47, a second target private key is generated by using the target identity information.

At S48, the present private key of the target user is replaced with the second target private key.

The detailed description of S47-S48 may refer to the corresponding description of S37-S38 in the second embodiment and will not be elaborated herein again.

Figure 5:
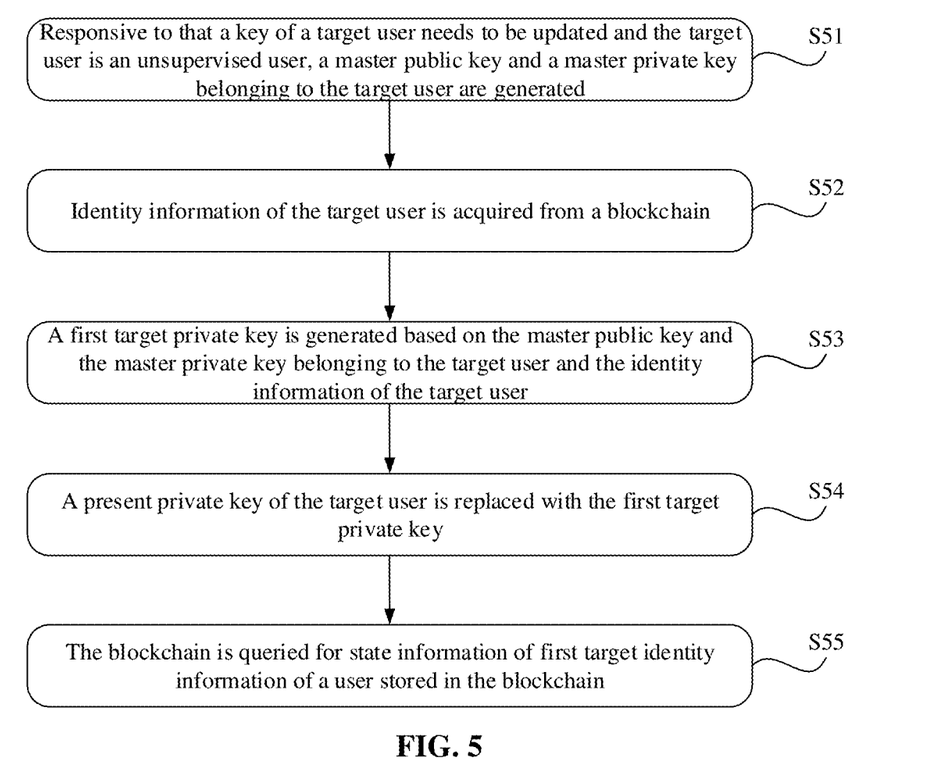
FIG. 5 illustrates a schematic flowchart of a further key management process according to embodiments of the present disclosure.

As a fourth embodiment of the present disclosure, as illustrated in FIG. 5 is a schematic flowchart of a further key management process provided according to the present disclosure. The embodiment mainly lies in an extended method for the key management process described in the above first embodiment. As illustrated in FIG. 5, the method may include but is not limited to the following operations.

At S51, responsive to that a key of a target user needs to be updated and the target user is an unsupervised user, a master public key and a master private key belonging to the target user are generated.

At S52, identity information of the target user is acquired from a blockchain.

At S53, a first target private key is generated based on the master public key and the master private key belonging to the target user and the identity information of the target user.

At S54, a present private key of the target user is replaced with the first target private key.

The detailed description of S51-S54 may refer to the corresponding description of S21-S24 in the first embodiment and will not be elaborated herein again.

At S55, the blockchain is queried for state information of first target identity information of a user stored in the blockchain.

The state information of the first target identity information may include but is not limited to: whether the first target identity information has been registered, whether the first target identity information belongs to a supervised user, and whether the identity information is valid currently.

It would be understood that storing the state information of the identity information in the blockchain may prevent the state information of the identity information being tampered with, so as to ensure the reliability of the queried state information of the first target identity information.

Figure 6:
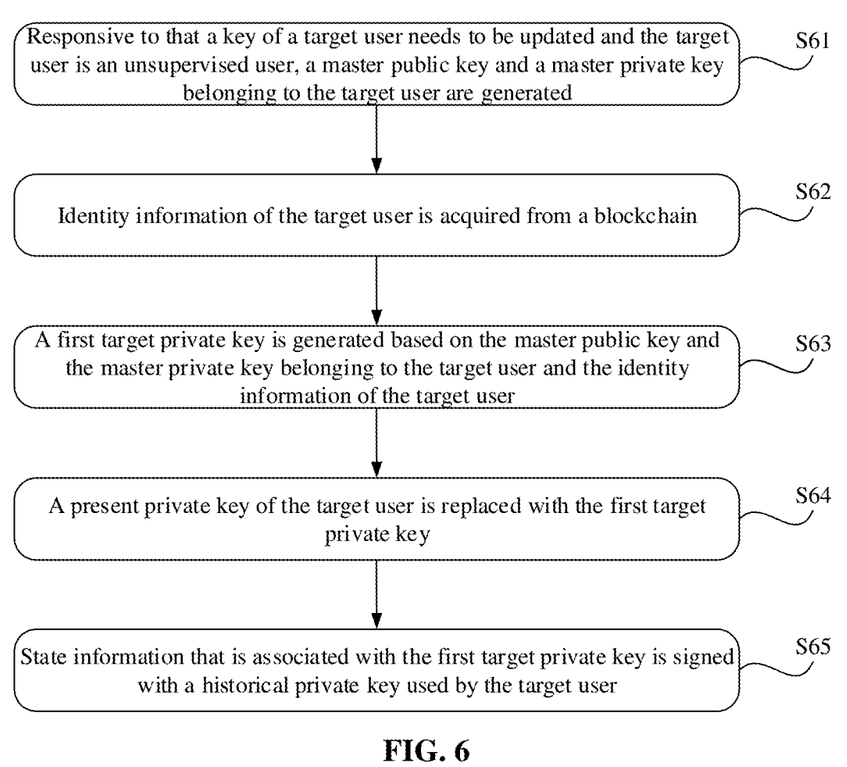
FIG. 6 illustrates a schematic flowchart of a further key management process according to embodiments of the present disclosure.

As a fifth embodiment of the present disclosure, as illustrated in FIG. 6 is a schematic flowchart of a further key management process provided according to the present disclosure. The embodiment mainly lies in an extended method for the key management process described in the above first embodiment. As illustrated in FIG. 6, the method may include but is not limited to the following operations.

At S61, responsive to that a key of a target user needs to be updated and the target user is an unsupervised user, a master public key and a master private key belonging to the target user are generated.

At S62, identity information of the target user is acquired from a blockchain.

At S63, a first target private key is generated based on the master public key and the master private key belonging to the target user and the identity information of the target user.

At S64, a present private key of the target user is replaced with the first target private key.

The detailed description of S61-S64 may refer to the corresponding description of S21-S24 in the first embodiment and will not be elaborated herein again.

At S65, state information that is associated with the first target private key is signed with a historical private key used by the target user.

The historical private key used by the target user may be understood as the private key used most recently before updating the private key of the target user to be the first target private key.

The state information associated with the first target private key may include but is not limited to: whether the identity information of the target user associated with the first target private key has been registered, whether the identity information of the target user associated with the first target private key belongs to a supervised user, and whether the identity information of the target user associated with the first target private key is valid currently.

Signing, with the historical private key used by the target user, state information that is associated with the first target private key may be understood as: signing, with a historical private key used by the target user, the legality of the state information associated with the first target private key.

Signing, with the historical private key used by the target user, the legality of the state information associated with the first target private key can ensure the validity of the state information associated with the first target private key.

In the key management process described in the foregoing various embodiments, if the identity information of a certain user needs to be logged off, the identity information of the user may be deleted from the blockchain while logging off the identity information of the user.

Next, a device for implementing identity-based key management by using a smart contract according to the present disclosure is described below. Corresponding reference may be made between the device for implementing identity-based key management by using a smart contract described below and the method for implementing identity-based key management by using a smart contract described above.

Figure 7:
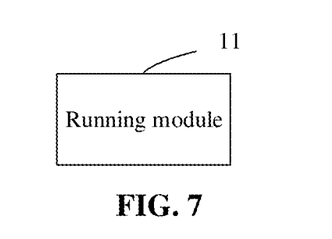
FIG. 7 illustrates a schematic diagram of a logical structure of a device for implementing identity-based key management by using a smart contract according to embodiments of the present disclosure.

As illustrated in FIG. 7, a device for implementing identity-based key management by using a smart contract includes a running module 11.

The running module 11 is configured to run the smart contract to execute a key management process. The key management process includes that: responsive to that a key of a target user needs to be updated and the target user is an unsupervised user, a master public key and a master private key belonging to the target user are generated; identity information of the target user is acquired from a blockchain; a first target private key is generated based on the master public key and the master private key belonging to the target user and the identity information of the target user; and a present private key of the target user is replaced with the first target private key.

In the embodiment, the key management process that the running module 11 is configured to run the smart contract to execute may further include that: responsive to that the target user is an unsupervised user and the present private key of the target user is leaked, or responsive to that the target user is a supervised user, the identity information of the target user is acquired from the blockchain; the identity information of the target user is updated, and the updated identity information is taken as target identity information; a second target private key is generated by using the target identity information; and the present private key of the target user is replaced with the second target private key.

In the embodiment, in the key management process that the running module 11 is configured to run the smart contract to execute, updating the identity information of the target user may include that: a variable part of the identity information of the target user is updated.

In the embodiment, the key management process that the running module 11 is configured to run the smart contract to execute may further include that: the blockchain is queried for state information of first target identity information of a user stored in the blockchain.

In the embodiment, the key management process that the running module 11 is configured to run the smart contract to execute may further include that: state information that is associated with the first target private key is signed by using a historical private key used by the target user.

It should be noted that the embodiments in this specification are all described in a progressive manner. Description of each of the embodiments focuses on differences from other embodiments, and reference may be made to each other for the same or similar parts among respective embodiments. For the device the embodiment, it basically corresponds to the method embodiment, thus the description of the device is relatively simple, and the reference can be made to the description for the related method portion.

Finally, it should also be noted that in the present disclosure, relational terms such as "first" and "second" may be used to distinguish one entity or operation from another entity or operation, without necessarily requiring or implying any actual relationship or order between such entities or operations. Moreover, the terms "include", "comprise", and any other variant thereof are intended to cover a non-exclusive inclusion. Therefore, a process, method, object, or device including a series of elements may also include other elements not specified expressly, or may include inherent elements of the process, method, object, or device. Unless otherwise specified, an element limited by "include a/an . . . " does not exclude other same elements existing in the process, method, object, or device that includes the elements.

For the convenience of description, the above device is described as different units according to the functions thereof respectively. When implementing the present disclosure, the functions of various units may be implemented in one or more instances of software and/or hardware.

From the embodiments described above, one skilled in the art can clearly understand that the present disclosure may be implemented using software with an essential universal hardware platform. Based on such understanding, the technical solution of the present disclosure substantively, or a part thereof making a contribution to the prior art, may be reflected in the form of computer software product which may be stored in a storage medium such as a read-only memory (ROM) or a random access memory (RAM), magnetic disk and optical disk, and the computer software product includes several instructions to enable a computer device (e.g., a personal computer, a server, or a network device) to execute the method of respective embodiment or a certain part thereof in the present disclosure.

The method and device for implementing identity-based key management by using a smart contract provided by the present disclosure have been described above in detail, and particular embodiments are used herein to illustrate the principle and embodiments of the present disclosure, which are only used to help understand the methodology and concept of the present disclosure. Moreover, one of ordinary skill in the art would make changes of the detailed description and application scope based on the idea of the present disclosure. Accordingly, the content of the specification should not be construed as limitations on the present disclosure.

The invention claimed is:

1. A method for implementing identity-based key management by using a smart contract, comprising:
running the smart contract to execute a key management process, wherein the key management process comprises:
responsive to that a key of a target user needs to be updated and the target user is an unsupervised user, generating a master public key and a master private key belonging to the target user;
acquiring identity information of the target user from a blockchain;
generating a first target private key based on the master public key and the master private key belonging to the target user and the identity information of the target user; and
replacing a present private key of the target user with the first target private key.

2. The method of claim 1, wherein the key management process further comprises:
responsive to that the target user is an unsupervised user and the present private key of the target user is leaked, or responsive to that the target user is a supervised user, acquiring the identity information of the target user from the blockchain;
updating the identity information of the target user, and taking the updated identity information as target identity information;
generating a second target private key by using the target identity information; and
replacing the present private key of the target user with the second target private key.

3. The method of claim 2, wherein updating the identity information of the target user comprises:
updating a variable part of the identity information of the target user.

4. The method of claim 1, wherein the key management process further comprises:
querying the blockchain for state information of first target identity information of a user stored in the blockchain.

5. The method of claim 1, wherein the key management process further comprises:
signing, with a historical private key used by the target user, state information associated with the first target private key.

6. A device for implementing identity-based key management by using a smart contract, comprising:
a processor; and
a memory configured to store instructions that, when executed by the processor, cause the processor to run the smart contract to execute a key management process, wherein the key management process comprises:

responsive to that a key of a target user needs to be updated and the target user is an unsupervised user, generating a master public key and a master private key belonging to the target user;

acquiring identity information of the target user from a blockchain;

generating a first target private key based on the master public key and the master private key belonging to the target user and the identity information of the target user; and replacing a present private key of the target user with the first target private key.

7. The device of claim 6, wherein the key management process further comprises:

responsive to that the target user is an unsupervised user and the present private key of the target user is leaked, or responsive to that the target user is a supervised user, acquiring the identity information of the target user from the blockchain;

updating the identity information of the target user, and taking the updated identity information as target identity information;

generating a second target private key by using the target identity information; and replacing the present private key of the target user with the second target private key.

8. The device of claim 7, wherein in the key management process, updating the identity information of the target user comprises:

updating a variable part of the identity information of the target user.

9. The device of claim 6, wherein the key management process further comprises:

querying the blockchain for state information of first target identity information of a user stored in the blockchain.

10. The device of claim 6, wherein the key management process further comprises:

signing, with a historical private key used by the target user, state information associated with the first target private key.

11. A non-transitory computer-readable storage medium having stored thereon instructions, wherein the instructions, when executed by a processor, cause the processor to implement a method for implementing identity-based key management by using a smart contract, comprising:

running the smart contract to execute a key management process, wherein the key management process comprises:

responsive to that a key of a target user needs to be updated and the target user is an unsupervised user, generating a master public key and a master private key belonging to the target user;

acquiring identity information of the target user from a blockchain;

generating a first target private key based on the master public key and the master private key belonging to the target user and the identity information of the target user; and replacing a present private key of the target user with the first target private key.

12. The non-transitory computer-readable storage medium of claim 11, wherein the key management process further comprises:

responsive to that the target user is an unsupervised user and the present private key of the target user is leaked, or responsive to that the target user is a supervised user, acquiring the identity information of the target user from the blockchain;

updating the identity information of the target user, and taking the updated identity information as target identity information;

generating a second target private key by using the target identity information; and replacing the present private key of the target user with the second target private key.

13. The non-transitory computer-readable storage medium of claim 12, wherein updating the identity information of the target user comprises:

updating a variable part of the identity information of the target user.

14. The non-transitory computer-readable storage medium of claim 11, wherein the key management process further comprises:

querying the blockchain for state information of first target identity information of a user stored in the blockchain.

15. The non-transitory computer-readable storage medium of claim 11, wherein the key management process further comprises:

signing, with a historical private key used by the target user, state information associated with the first target private key.

* * * * *